United States Patent [19]

Deaver

[11] Patent Number: 4,558,898
[45] Date of Patent: Dec. 17, 1985

[54] AERODYNAMIC WING DEVICE AND METHOD OF MAKING SAME

[76] Inventor: Dann T. Deaver, 20565 Williamsburg Ct., Harper Woods, Mich. 48236

[21] Appl. No.: 613,054

[22] Filed: May 22, 1984

[51] Int. Cl.$^4$ ............................................. B62D 35/00
[52] U.S. Cl. ..................................... 296/1 S; 416/233
[58] Field of Search ....................... 296/1 S; 244/123; 416/233; D12/88

[56] References Cited

U.S. PATENT DOCUMENTS

| D. 260,913 | 9/1981 | Chapman | D12/88 |
| 2,925,996 | 2/1960 | Stalker | 416/233 |
| 3,455,594 | 7/1969 | Hall et al. | 296/1 S |
| 3,606,580 | 9/1971 | Kaufman, Sr. | 416/233 |
| 3,623,745 | 11/1970 | Taylor | 296/1 S |

Primary Examiner—Robert R. Song
Attorney, Agent, or Firm—Harness, Dickey & Pierce

[57] ABSTRACT

A light-weight aerodynamic wing device is adapted for mounting on a vehicle in a generally horizontal orientation and in a generally vertically spaced-apart relationship with the vehicle. The wing device is preferably extruded from aluminum and includes generally horizontal upper and lower peripheral walls interconnected to enclose a hollow elongated body. The body can be horizontally and/or vertically swept after extrusion into desired swept configurations for particular vehicular installations. The wall thickness of one or both of the peripheral wall portions is greatest at the compressed portion of the elongated body in order to substantially prevent buckling during horizontal sweep forming. One or more vertical reinforcing members can also be included in the hollow elongated body and extend between the upper and lower peripheral walls. The wing device also preferably includes air-retaining end caps at opposite ends of the elongated body, with the end caps being adapted to be snapped into the open opposite ends of the hollow extruded body. Mounting means, preferably including one or more universally-adapted stanchion members, are also provided and are adapted to be laterally adjustable along the length of the elongated extruded body in order to accommodate a wide variety of vehicular installations.

26 Claims, 9 Drawing Figures

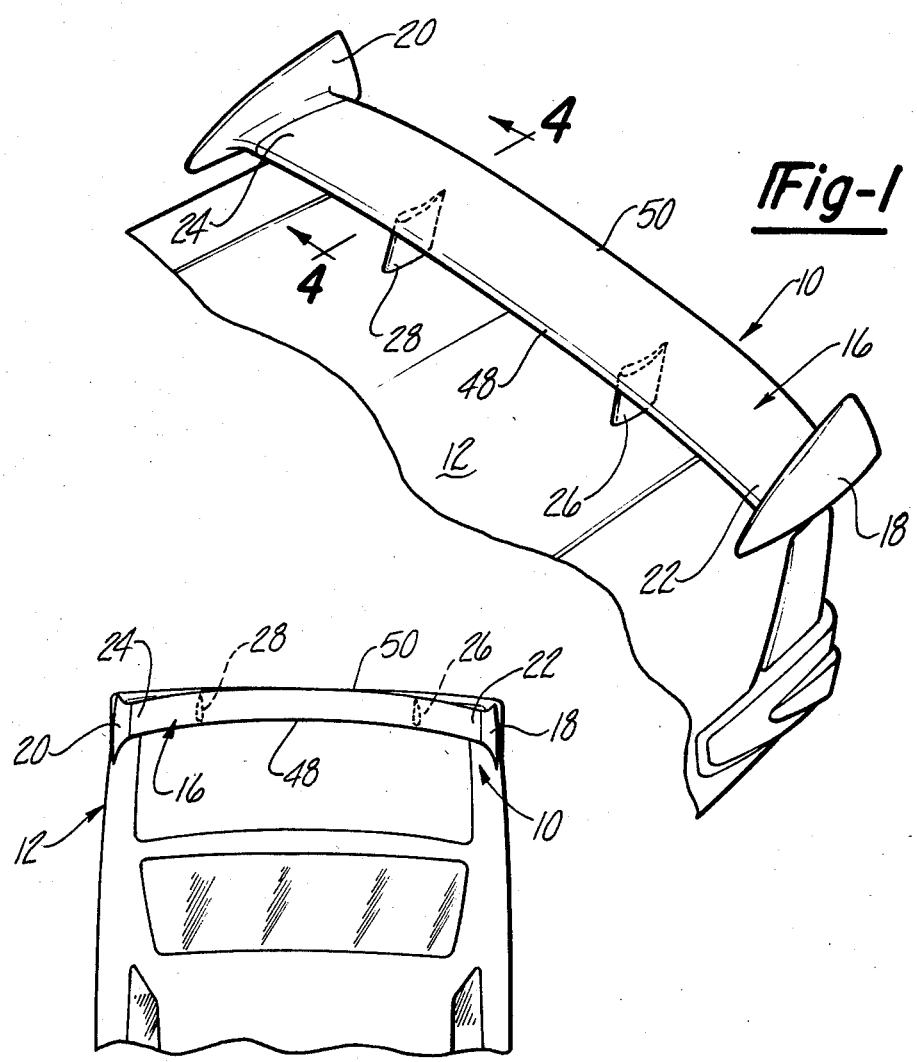
Fig-1
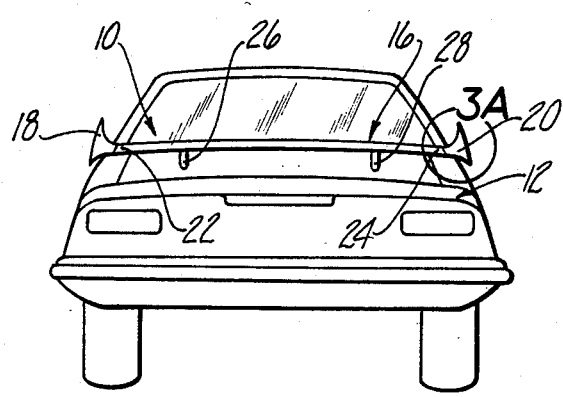
Fig-2
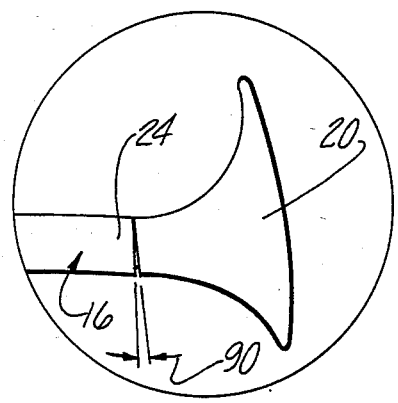
Fig-3
Fig-3A

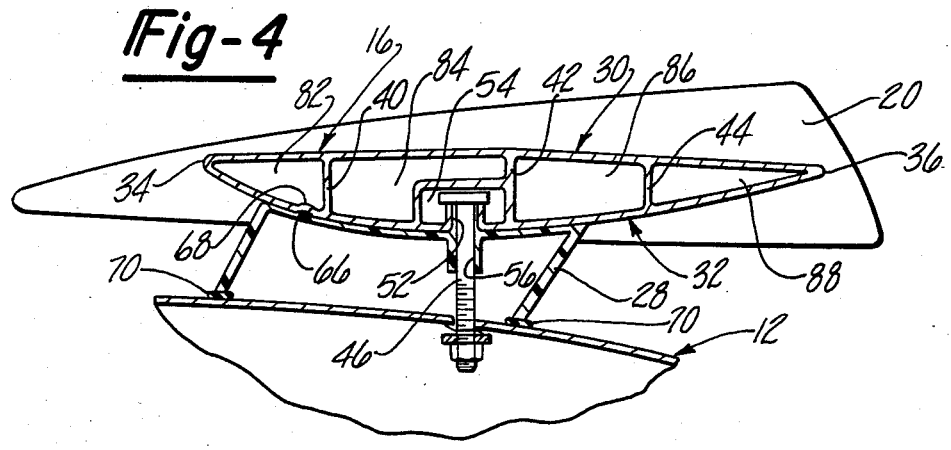
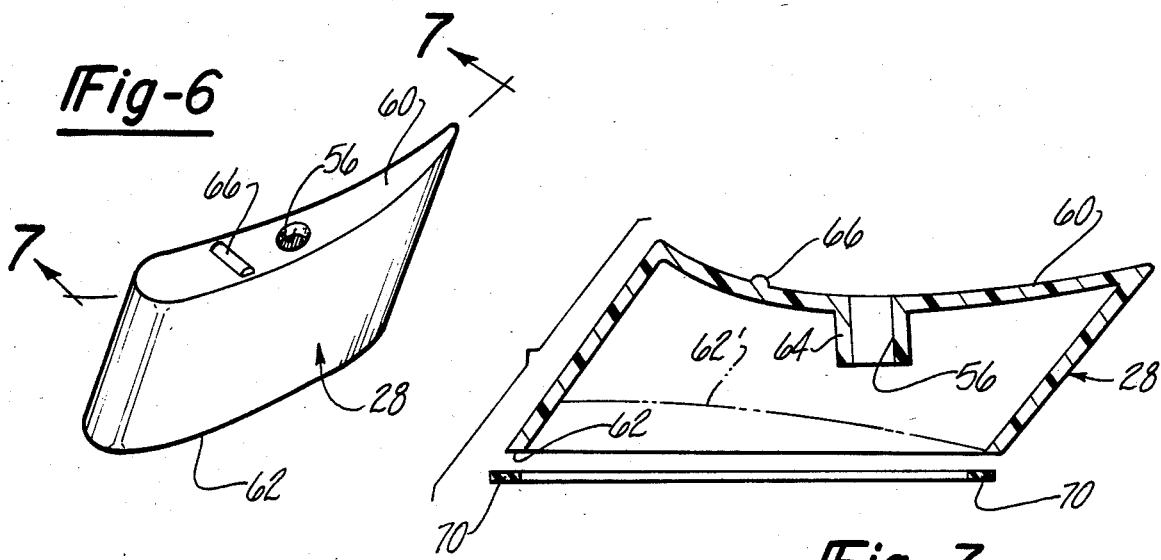
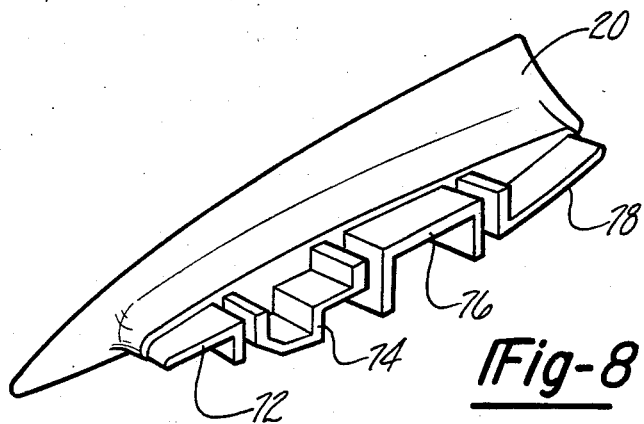

AERODYNAMIC WING DEVICE AND METHOD OF MAKING SAME

BACKGROUND AND SUMMARY OF THE INVENTION

The invention relates generally to aerodynamic wing devices and more particularly to such aerodynamic wing devices adapted to be mounted on a vehicle in a generally horizontal orientation and in a generally vertically spaced-apart relationship with the vehicle.

Aerodynamic wing devices have been previously used on land vehicles for purposes of creating a generally downwardly-directed force in order to compensate for the vehicle's tendency to lift during certain operating conditions. Such aerodynamic wing devices generally function as an inverted airfoil and have frequently been mounted on a generally rearward portion of an automobile, for example, in order to provide improved rear-wheel traction, directional stability, reduced aerodynamic drag, and other enhanced handling characteristics at high speeds, for example. Such aerodynamic wing devices, being supported in a vertically spaced-apart relationship from the automobile or other vehicle, are believed to be significantly more effective than the so-called spoiler devices that curve or otherwise integrally protrude or project upwardly from the rear of the vehicle. Such spoiler devices are believed to cause significant drag, thereby reducing the vehicle's aerodynamic efficiency especially at high speed operation.

Aerodynamic wind devices such as those described above have been used on competition vehicles for many years, and have recently appeared on production vehicles, but have generally been inordinately heavy, as well as being difficult and expensive to fabricate and install. Such difficulty and expense results largely from the fact that the previous wing devices were typically fabricated of laminated fiberglass or sheet molding compound, or by way of aluminum sheet forming techniques. Furthermore, the shape and configuration of aerodynamic wing devices are usually required to vary from vehicle-to-vehicle in order to match and complement the styling of various vehicles, both aesthetically and aerodynamically. Accordingly, previous aerodynamic wing devices were produced separately for each model or style of vehicle upon which they were to be installed. In the present invention, a light-weight aerodynamic wing device has been devised that is convenient and inexpensive to manufacture and install, and that can be adapted for mounting on a number of different vehicle body styles by using universally fabricated parts and components.

According to the present invention, a light-weight aerodynamic wing device is adapted to be mounted in a generally horizontal orientation on a vehicle or the like, in a generally vertically spaced-apart relationship therewith, an is preferably extruded from aluminum, for example, into a generally hollow and elongated body of any desired length, with spaced-apart generally horizontal upper and lower peripheral wall portions that are interconnected at the forward and rearward edges to enclose the hollow body. The preferred body is extruded, and then horizontally and/or vertically formed into a predetermined horizontally and/or vertically swept configuration, and is cut to a predetermined length either before or after the sweep is formed. In forming the horizontal sweep, an inner side portion of the hollow body is placed in compression, with the opposite outer side portion being placed in tension. In order to avoid buckling during sweep forming, and to maintain weight and material to a minimum, at least one of the generally horizontal peripheral wall portions is provided with a wall thickness that is tapered and that decreases from the compressed inner side portions of the body to the tensioned outer side portions of the body. The body portion of the aerodynamic wing device, also preferably includes at least one generally vertical reinforcing member extending between, and attached to, the upper and lower horizontal wall portions generally in the vicinity of the compressed inner side portion in order to provide additional resistance to the buckling of the horizontal wall portions. By such a construction, the body portions of the aerodynamic wing devices for a wide variety of vehicular applications may be cut to predetermined lengths and formed into a desired horizontal and/or vertical swept configuration from one common, universal extrusion, and at the same time the device's weight and material can be minimized. It should be noted that the common extruded body portion may be swept horizontally such that its intermediate portion is curved or swept in either a forward or a rearward direction, and/or is curved or swept vertically in either an upward or a downward direction.

In order to further facilitate the use of common or universal component parts, and to minimize the number of variations thereof, a preferred aerodynamic wing device according to the present invention also includes end caps at opposite ends of the elongated body, with the end caps preferably being injection molded from a light-weight thermoplastic or other synthetic material. The end caps are provided to assist in retaining the air moving over the wing device and preferably have protuberances thereon that are sized and configured to be relatively tightly inserted into the open opposite ends of the extruded elongated body. It should also be noted that the ends of the extruded body can be cut at various vertical and/or horizontal angles in order to preselect the horizontal and/or vertical angular orientations of the end caps, thereby adapting the aerodynamic wing device to various vehicular body styles with only a single universal body extrusion and a single end cap configuration. Alternatively, a variety of interchangeable end cap configurations may be provided in order to offer a variety of styling options, using a single body extrusion.

The preferred aerodynamic wing device according to the present invention also preferably includes one or more mounting means for attaching and securing the aerodynamic wing device to a forward, rearward, or even an intermediate lower body or roof panel of the vehicle, with the lateral location of each of the mounting means being preselectively adjustable relative to the elongated body in order to accommodate a wide variety of mounting situations. Such mounting means also includes a mounting stanchion that is preferably injection molded from a light-weight thermoplastic or other synthetic material and has a lower annular edge portion that may be preselectively trimmed to closely accommodate and mate with the contour of the vehicle panel upon which the aerodynamic wing device is to be mounted. Furthermore, a single stanchion configuration and size can be used in a variety of insallations since the height can also be preselectively altered by trimming.

Additional objects, advantages and features of the present invention will become apparent from the following description and appended claims, taken in conjunction with the accompanying drawings.

BRIEF DESCRIPTION OF THE DRAWINGS

FIG. 1 is a perspective view of the rear portion of a vehicle having a rearwardly and upwardly swept aerodynamic wind device according to the present invention mounted thereon.

FIG. 2 is a top view of the rear portion of the vehicle of FIG. 1.

FIG. 3 is a rear view of the vehicle of FIG. 1.

FIG. 3A is an enlarged detail view of the circled portion of FIG. 3.

FIG. 4 is a longitudinal cross-sectional view of the body portion of the aerodynamic wing device, taken generally along lines 4—4 of FIG. 1.

FIG. 6 is a perspective view of one of the stanchion members for the aerodynamic wing device shown in FIG. 1.

FIG. 7 is a longitudinal cross-sectional view of the stanchion device of FIG. 6, taken generally along line 7—7 of FIG. 6.

FIG. 8 is a perspective view of one of the end caps of the aerodynamic wing device of FIG. 1, shown removed from the body portion of the wing device.

DETAILED DESCRIPTION OF THE PREFERRED EMBODIMENTS

Figure 5:
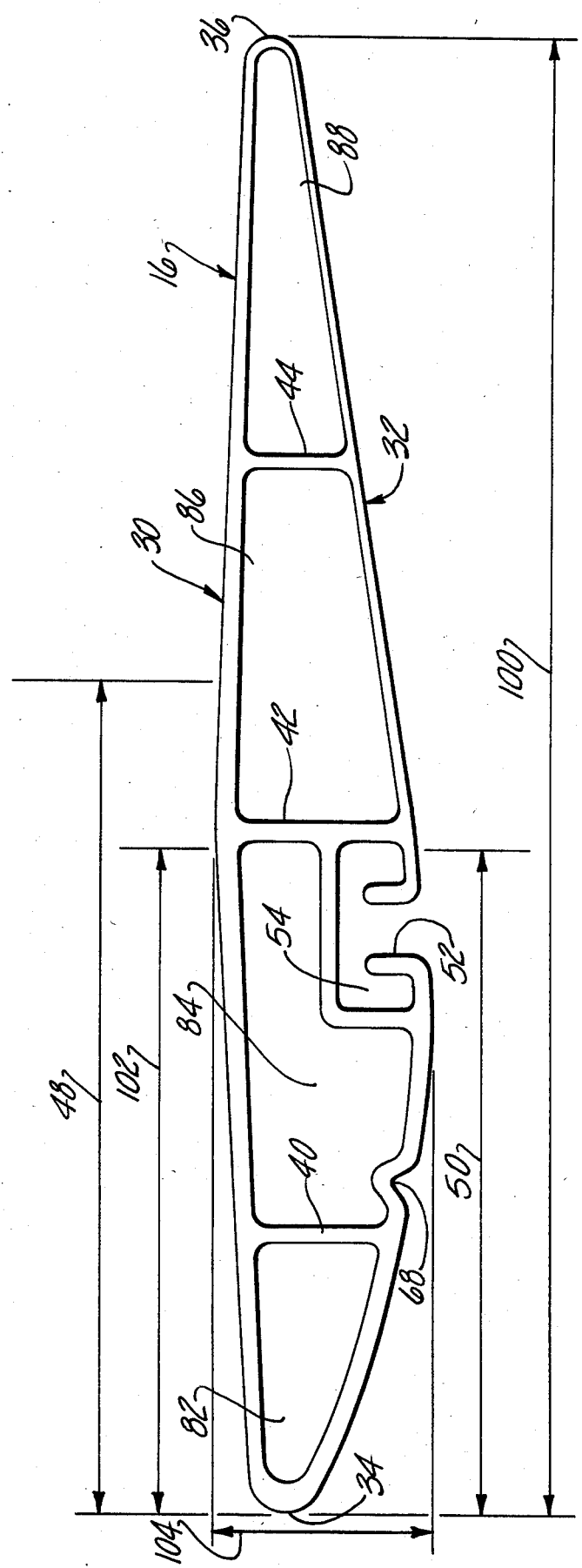
FIG. 5 is an enlarged longitudinal cross-sectional view, similar to that of FIG. 4, of the body portion of the aerodynamic device of FIG. 1.

FIGS. 1 through 8 illustrate exemplary preferred embodiments of the present invention in the form of an aerodynamic wind device adapted for being mounted in a generally horizontal orientation on a rearward portion of an automobile or other land vehicle, with the aerodynamic wing device being supported in a generally vertically spaced-apart relationship with the vehicle. It should be noted, however, that the embodiments shown in the drawings are for purposes of illustrating the invention and that the principles of the present invention are equally applicable to other aerodynamic wing-type devices for use in connection with other types of vehicles, even including two-wheeled vehicles such as motorcycles or bicycles, for example. It should also be noted that the aerodynamic wing device can be mounted at a rearward, a forward, or any intermediate longitudinal location on the main body or the roof of the vehicle. As one skilled in the art will readily recognize from the following discussion, the particular longitudinal location on the vehicle depends upon the type of lifting effects that are desired to be minimized or eliminated.

In FIGS. 1 through 3, an exemplary aerodynamic wing device 10 is shown mounted in a generally horizontal orientation on a rearward panel portion of a vehicle 12 and in a generally vertically spaced-apart relationship therewith. The aerodynamic wing device 10 includes an elongated body 16 extending laterally across a rearward panel of the vehicle 12 and has a pair of end caps 18 and 20 attached to the elongated body 16 at laterally opposite end portions 22 and 24, respectively, in order to generally contain the air flowing over the body 16 in the area between the end caps 18 and 20. The elongated body 16, with the end caps 18 and 20 thereon, is secured to the vehicle 12 and supported in a generally vertically spaced-apart relationship therewith by mounted means, including one or moe stanchion members 26 and 28 that are also aerodynamically-shaped.

As shown in FIGS. 4 and 5, the elongated body 16 has a peripheral contour generally similar to an inverted airfoil, and thus produces a generally downwardly-directed force that reduces the tendency of the rearward portion of the vehicle 12 to lift at high speeds or in high wind conditions, for example, thereby enhancing the traction or frictional engagement of the rear wheels with the road surface. Preferably, the elongated body 16 has a generally inverted airfoil cross-sectional shape, as shown in FIGS. 4 and 5, and is formed by an extrusion process, with a cross-sectional shape and configuration that is substantially uniform along its length, and is then cut to a desired length and formed into a horizontally and/or vertically swept configuration as is described below. The body 16 includes a pair of vertically spaced-apart, generally horizontal upper and lower peripheral walls 30 and 32, respectively, with the upper and lower walls 30 and 32 being somewhat arcuate and interconnected both at the front edge portion 34 and at the rear edge portion 36 in order to enclose the generally hollow extruded elongated body 16.

As further shown in FIGS. 1 through 3, the elongated body 16, which is preferably extruded from aluminum or other known extrudable materials, can be horizontally or vertically swept by conventional sweep-forming methods in order to form a desired shape or configuration for a given vehicular installation. In the example shown in the drawings, the elongated body is horizontally swept such that its intermediate portion is curved generally toward a generally rearward direction relative to the ends such that during the horizontal sweep-forming the forward side portion of the elongated body 16 generally along the front edge portion 34 has been compressed and the rearward side portion of the elongated body 16 generally along the rearward edge portion 36 has been placed in tension.

Although it is desirable to minimize the weight of the body 16, it was found that when the wall thickness of the horizontal walls 30 and/or 32 was reduced to a minimum desired thickness, there was a tendency for such walls 30 and/or 32 to buckle near the compressed front edge portion 34 during the forming of the horizontal sweep. In order to substantially prevent or minimize buckling, while maintaining weight at a minimum, at least one, and preferably both, of the horizontal peripheral walls 30 and 32 are extruded with tapered wall thicknesses. These wall thicknesses decrease across the forward or inner side or surface portions 48 and 50 of the peripheral walls 30 and 32, respectively, (adjacent the front edge portion 34) toward the tensioned outer side or surface portions of the peripheral walls 30 and 32 adjacent the rearward edge portion 36. Such tapering of the thickness of one or both of the horizontal wall thicknesses allows the aerodynamic wing device 10 to have an overall light-weight construction, but also to have sufficient horizontal wall thicknesses and strength where needed to substantially resist buckling during compression when the body 16 is sweep-formed. Such tapering thus avoids abrupt changes in the wall cross-section in the incipient buckling area. At the same time the thinner wall thickness at the opposite (tensioned) side portion facilitates the requisite tensioning and helps minimize weight.

Further to substantially minimize or eliminate buckling of the horizontal wall portions 48 and/or 50, the preferred elongated body 16 is also provided with a generally vertical reinforcing member 40. The reinforcing member 40 interconnects the tapered wall portions 48 and 50 at a location proximate to the area of potential buckling. Such vertical reinforcing member 40, being located at the compressed side portion of the body 16, supplements the above-described tapered wall thickness in order to substantially resist buckling during horizontal sweep forming.

As shown in FIG. 5, in one actually-constructed embodiment of the aerodynamic wing device 10, wherein the distance 100 between the inner or front edge portion 34 and the outer or rearward edge portion 36 in the elongated body 16 was 6.5 inches, the thickness of the upper peripheral wall portion 48 was tapered from a thickness of approximately 0.10 inch to approximately 0.06 inch over a distance of approximately 3.75 inches from the front edge portion 34. Similarly the thickness of the lower peripheral wall portion 50 was tapered from a thickness of approximately 0.10 inch to approximately 0.08 inch over a distance of approximately 3.0 inches from the front edge portion 34. In this actually-constructed embodiment, the vertical reinforcing member 40 was located a distance of approximately 1.3 inches from the front edge portion 34, or approximately 20 percent of the distance 100 between the innermost and outermost edges 34 and 36, with the range of such percentage being approximately 15 percent to approximately 25 percent. The reinforcing member 40 was extruded with a thickness of approximately 0.09 inch, while the remaining vertical reinforcing members 42 and 44 were fabricated with thicknesses of approximately 0.06 inch to approximately 0.07 inch. It should also be noted that in the actually-constructed embodiment, the vertical reinforcing member 42 was located a distance 102 of approximately 3.0 inches from the front edge portion 34, with the vertial reinforcing member 44 being located approximately 4.7 inches from the front edge portion 34. The maximum vertical height of the body 16 in this actually-constructed example was approximately 0.840 inch.

With the above-discussed actual construction, rearward horizontal sweeps or curvatures of a zero sweep up to approximately a No. 15 sweep were possible without buckling. A No. 15 sweep is approximately equivalent to a 241 inch radius in the above-mentioned actual example. As is well-known in the art a "sweep number" is the number of ⅛ inch increments of chord depth over a five-foot increment of chord length. Thus, a "No. 15 sweep" refers to a maximum chord depth of fifteen-eighths (15/8") inch over a five-foot increment of chord length. The relatively greater wall thickness of one or both of the tapered horizontal peripheral wall portions 48 and 50 should be generally at the area that is subjected to compression during horizontal sweep-forming, whether the elongated body is being subjected to rearward-curved or to forward-curved sweep-forming. It should be understood that variations in wing configuration could be accommodated based upon the preceding dimensional information for the actually-constructed exemplary embodiment.

As further shown in FIG. 4, the mounting means for securing the elongated body 16 and the end cap members 18 and 20 to the vehicle 12 also includes a generally T-shaped fastener 46 with a generally elongated and enlarged head that engages the body 16, with the fastener 46 extending through the respective stanchion 28 (or 26) to attachingly engage a panel portion of the vehicle 12. In extruding the elongated body 16, an elongated slot 52 is formed therein and is in communication with an elongated generally channel-shaped receptacle 54. The receptacle 54 is adapted to receive and interlockingly engage the elongated and enlarged head portion of the fastener 46. The remainder or shank of the fastener 46 extends through the slot 52 and an aperture 56 in the respective stanchion member 28 (or 26). By such an arrangement, the lateral position of the T-shaped fastener 46 and the respective stanchion member 28 (or 26) may be preselectively altered to accommodate installation of the aerodynamic wing 10 on a wide variety of vehicles having different panel contours or different panel reinforcing member locations.

As shown in FIGS. 6 and 7, the stanchion member 28 (or 26) is preferably injection molded in a generally hollow configuration having an upper contoured portion 60 configured to mate with, and complement, the lower surface of the elongated body 16. The stanchion member 28 (or 26) also includes a lower annular edge portion 62 that can be preselectively trimmed to mate with, and complement, the contour of the vehicular surface upon which the aerodynamic wing 10 is to be mounted, as well as being preselectively trimmed to a desired height. Thus, a standard or universal stanchion 28 (or 26) can be formed in a configuration such that it is adaptable to a very wide variety of vehicular installations for the aerodynamic wing 10.

The upper contoured portion 60 of the stanchion 28 (or 26) is formed with an annular sleeve portion 64 having the above-mentioned aperture 56 extending therethrough for receiving the shank of the fastener 46 therein. A rib 66 is integrally formed in the upper contoured portion 60 of the stanchion member 28 (or 26) and is adapted to interlockingly engage an elongated recess or groove 68 extruded in the lower horizontal peripheral walls 32 of the body 16, as shown in FIG. 4. The interaction of the rib 66 and the recess 68 allow the stanchion 28 (or 26) to be properly located and to resist rotation relative to the body 16 to provide the required support and stability for the aerodynamic wing 10 when it is secured to the vehicle 12 by means of fasteners 46. Furthermore, in order to prevent the ingress and accummulation of water or other foreign materials between the stanchion 28 (or 26) and the vehicle 12, an annular gasket 70 sealingly engages both the panel of the vehicle 12 and the lower annular edge portion 62 of the stanchion 28 (or 26).

Referring to FIG. 8, the end cap 20 (which is symmetrical and opposite-handed with respect to the end cap 18) is shown removed from the elongated body 16. The end cap 20 (and similarly the end cap 18) preferably includes one or more protuberances, such as those indicated by reference numeral 72, 74, 76, and 78, with the protuberances 72 through 78 being of a cross-sectional shape complementary to the cross-sectional shape of the openings 82, 84, 86, and 88, in the open end portions 24 (and 20, respectively). The protuberances 72 through 78 are sized and configured to be relatively tightly received and press-fit in the corresponding openings 82 through 88 in the extruded elongated body 16. If necessary or desired, the end caps 18 or 20 may be further secured to their respective end portions 22 and 24 by an adhesive or by other fastening or securing means known to those skilled in the art.

It should also be noted that in order to accommodate various aerodynamic configurations, as well as to accommodate and complement various body styles and vehicle configurations, the end portions 22 and 24 of the elongated body 16 can be cut at predetermined horizontal and/or vertical angles in order to preselectively alter the vertical and/or horizontal angles at which the end cap members 18 and 20 are oriented. When it is cut to its required length, the body 16 can also be cut at a slight angle, such as is indicated by angle 90 in FIG. 3, and shown in exaggerated form in FIG. 3A, so that the end caps 18 and 20 fit most tightly on the more visible upper surfaces of the aerodynamic wing device 10, thereby enhancing the fit and aesthetic appearance on the upper surface of the wing device 10. As is mentioned above, a number of different shapes of end caps can be provided in order to offer a variety of styling options, using only a single cross-section for the body 16.

As is also mentioned above, the wing device 10 can alternatively be forwardly-swept rather than the rearwardly-swept configuration in the drawings. Similarly, the wing device can alternatively be downwardly-swept in lieu of the upwardly swept wing device 10 shown in the drawings.

The foregoing discussion discloses and describes exemplary embodiments of the preferred invention. One skilled in the art will readily recognize from such discussion that various changes, modifications and variations may be made therein without departing from the spirit and scope of the invention as defined in the following claims.

What is claimed is:

1. An aerodynamic wing device adapted to be mounted horizontally on an automotive type vehicle, said aerodynamic wing device including a substantially hollow elongated body having generally horizontal upper and lower peripheral wall portions interconnected to enclose said body, said body being formed by bending into a predetermined horizontally swept configuration, said peripheral wall portions having a wall thickness that decreases from a generally compressed inner side portion of said body to a generally tensioned outer portion of said body, said wall thickness tapering from approximately 0.1 inch to approximately 0.06 inch, said wall thickness being greater at said generally compressed inner side portion of said horizontally swept body in order to substantially prevent buckling of said horizontal peripheral wall portions at said compressed inner side portion during bending to form said horizontally swept configuration, said swept configuration being in the range of a zero sweep to approximately a No. 15 sweep without buckling.

2. An aerodynamic wing device according to claim 1, wherein said hollow elongated body further includes a generally vertical reinforcing member extending between said upper and lower wall portions and attached thereto, said vertical reinforcing member being located proximate at said compressed inner side portion of said horizontally swept body.

3. An aerodynamic wing device according to claim 2, with said body being constructed of extruded aluminum and with buckling being prevented with said body having a width of approximately 6.5 inches and a height of approximately 0.84 inch and wherein said upper wall portion tapers in thickness for approximately 3.75 inches and said lower wall portion tapers in thickness for approximately 3.00 inches and with said vertical member being located approximately 1.3 inches from the edge of said compressed inner side portion.

4. An aerodynamic wing device adapted to be mounted horizontally on a land vehicle or the like, said aerodynamic wing device including a substantially hollow elongated body having generally horizontal upper and lower peripheral wall portions interconnected to enclose said body, said body being formed by bending into a predetermined horizontally swept configuration, said peripheral wall portions having wall thicknesses that decrease from a generally compressed inner side portion of said body to a generally tensioned outer side portion of said body, said wall thicknesses being greater at said generally compressed inner side portion of said horizontally swept body in order to substantially prevent buckling of said horizontal peripheral wall portions at said compressed inner side portion during bending to form said horizontal swept configuration.

5. An aerodynamic wing device according to claim 4, wherein said elongated body is also formed into a predetermined vertically swept configuration.

6. An aerodynamic wing device according to claim 4, wherein said hollow elongated body further includes at least one generally vertical reinforcing member extending between said upper and lower wall portions and attached thereto, said vertical reinforcing member being located generally at said compressed inner side portion of said horizontally swept body.

7. An aerodynamic wing device according to claim 6, wherein said body is horizontally swept toward a generally rearward direction, said vertical reinforcing member being located at a generally forward compressed inner side portion of said horizontally swept body.

8. An aerodynamic wing device according to claim 6, wherein the horizontal distance between said vertical reinforcing member and the innermost edge of said compressed inner side portion of said body is approximately 20 percent of the horizontal distance between said innermost edge and the outermost edge of said tapered outer side portion of said body.

9. An aerodynamic wing device according to claim 4, further including end caps at opposite ends of said body, said end caps having protuberances thereon and said opposite ends of said body being generally open for receiving said protuberances of the respective end caps therein.

10. An aerodynamic wing device according to claim 9, wherein said protuberances on said end caps have a cross-sectional shape complementary to that of said open ends and are adapted to be relatively tightly received therein.

11. An aerodynamic wing device according to claim 4, wherein said body further includes end members at opposite ends thereof, said end members having vertically extending portions thereon, said vertically extending portions tending to contain air flowing over said body between said opposite ends thereof.

12. An aerodynamic wing device according to claim 4, wherein said body includes an elongated opening on the lower side thereof, said opening communicating with an internal receptacle means formed along said horizontal lower peripheral wall portion for interlockingly receiving a partially enlarged fastener means therein, said internal receptable being generally continuously elongated for interlockingly receiving said fastener at various locations along the length of said body.

13. An aerodynamic wing device according to claim 4, further including at least one stanchion member for supporting said body on said vehicle in a generally vertically spaced relationship therewith, and means for securing said body and said stanchion member to said vehicle.

14. A generally horizontal aerodynamic wing device for a land vehicle or the like, said aerodynamic wing device including an extruded generally hollow elongated body having generally horizontal upper and lower wall portions interconnected to enclose the generally hollow extruded body, said extruded body being horizontally formed into a predetermined horizontally swept configuration, the vertical cross-sectional thickness of at least one of said horizontal wall portions being tapered from a relatively larger thickness at a generally compressed inner side portion of said horizontally swept extruded body to a relatively smaller thickness at a generally tensioned outer side portion, at least one generally vertical reinforcing member being integrally extruded between said upper and lower wall portions generally at said compressed inner side portion, and mounting means for mounting said horizontal aerodynamic wing device on said vehicle in a generally horizontal orientation and in a generally vertically spaced relationship therefrom.

15. An aerodynamic wing device according to claim 14, wherein said extruded elongated body is also vertically formed into a predetermined vertically swept configuration, said extruded elongated body being horizontally swept toward a generally rearward direction and vertically swept toward a generally upward direction.

16. An aerodynamic wing device according to claim 14, further including end caps at opposite ends of said extruded elongated body, and means for securing said end caps to said opposite ends of said body at any of a number of preselected angular relationships therewith.

17. An aerodynamic wing device according to claim 16, wherein said end caps have protuberances thereon, said opposite ends of said extruded elongated body being generally open for receiving said protuberances of the respective end caps therein in a relatively tight press-fit relationship therewith.

18. An aerodynamic wing device according to claim 14, wherein the horizontal distance between said vertical reinforcing member and the innermost edge of said compressed side portion of said body is in the range of approximately 15 percent to approximately 25 percent of the horizontal distance between said innermost edge of said compressed side portion and the outermost edge of said stretched side portion of said body.

19. An aerodynamic wing device according to claim 14, wherein the horizontal distance between said vertical reinforcing member and the innermost edge of said compressed side portion of said body is approximately 20 percent of the horizontal distance between said innermost edge of said compressed side portion and the outermost edge of said stretched side portion of said said body.

20. A method of making an aerodynamic wing device for a land vehicle or the like, said method comprising the steps of:
extruding an elongated generally hollow body member having a generally inverted airfoil wing shape, said body member including generally vertically spaced apart horizontal walls, with at least one of said walls being extruded with a tapered vertical wall thickness that decreases in a horizontal direction from a first side portion of said elongated body to a second opposite side portion thereof;
horizontally sweep-forming said elongated body into a predetermined horizontally swept configuration, said body being horizontally swept in a direction so that said first side portion of said body having said horizontal wall of a relatively greater thickness is generally compressed during said horizontal sweep-forming with said second opposite side portion of said body being generally tensioned during said horizontal sweep-forming said relatively greater thickness tending to resist buckling during said horizontal sweep-forming and said relatively lesser thickness facilitating tensioning during said horizontal sweep-forming.

21. A method according to claim 20, further including the step of simultaneously and integrally extruding a generally vertical reinforcing member extending between said upper and lower walls generally at said first side portion having the horizontal walls of said relatively greater thickness.

22. A method according to claim 21, wherein said vertical reinforcing member is integrally extruded at a location such that the horizontal distance between said vertical reinforcing member and the edge of said first outer side portion is approximately 20 percent of the distance between the edges of said first and second side portions.

23. A method according to claim 22, further comprising the steps of providing a stanchion member for mounting said body in a generally vertically spaced relationship from said vehicle, and removing a generally lower portion of said stanchion member to form a predetermined configuration adapted to match a predetermined contour of said vehicle.

24. A method according to claim 23, further comprising the steps of providing end caps and securing said end caps to opposite ends of said elongated body.

25. A method according to claim 20, further comprising the steps of simultaneously and integrally extruding an elongated opening and a channel-shaped receptacle in said lower horizontal wall, providing a partially-enlarged fastener and inserting and positioning said fastener at a predetermined location in said channel, said fastener being adapted for securing said body to said vehicle in a generally vertically spaced relationship therefrom.

26. A method according to claim 21, wherein said wall thickness of one of said walls tapers from approximately 0.1 inch to approximately 0.06 inch over a horizontal distance of approximately 3.75 inches out of a total cross-sectional horizontal width of said wing device of approximately 6.5 inches, and said wall thickness of the other of said walls tapering from approximately 0.1 inch to approximately 0.08 inch over a horizontal distance of approximately 3.0 inches, said generally elliptical body having a maximum cross-sectional height of approximately 0.84 inch, said vertical reinforcing member being located a horizontal distance of approximately 1.3 inches from the edge of said first side portion.

* * * * *

UNITED STATES PATENT AND TRADEMARK OFFICE
CERTIFICATE OF CORRECTION

PATENT NO. : 4,558,898

DATED : December 17, 1985

INVENTOR(S) : Dann T. Deaver

It is certified that error appears in the above-identified patent and that said Letters Patent is hereby corrected as shown below:

Column 1, line 40, delete "shape" and substitute therefor --shapes--.
Column 1, line 40, delete "configuration" and substitute therefor --configurations--.
Column 1, line 57, delete "an" and substitute therefor --and--.
Column 2, line 39, after "extruded" insert --elongated--.
Column 2, line 65, delete "insallations" and substitute therefor --installations--.
Column 3, line 34, delete "wind" and substitute therefor --wing--.
Column 3, line 68, delete "moe" and substitute therefor --more--.
Column 5, line 36, delete "vertial" and substitute therefor --vertical--.
Column 5, line 46, delete "+" and substitute therefor --"--.
Column 9, line 54, claim 19, line 17, delete "said said" second occurrence and substitute therefor --said--.

Signed and Sealed this

Fourteenth Day of October, 1986

[SEAL]

Attest:

DONALD J. QUIGG

Attesting Officer

Commissioner of Patents and Trademarks